(12) United States Patent
Shen et al.

(10) Patent No.: US 12,510,641 B2
(45) Date of Patent: Dec. 30, 2025

(54) POLARIZATION SPLITTER-ROTATOR HAVING SILICON BASED WAVEGUIDE WITH SILICON NITRIDE SEGMENT

(71) Applicant: AEVA, INC., Mountain View, CA (US)

(72) Inventors: Bing Shen, Sunnyvale, CA (US); Kevin Masuda, Alhambra, CA (US); Brett E. Huff, Keller, TX (US); Pradeep Srinivasan, Fremont, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 18/615,890

(22) Filed: Mar. 25, 2024

(65) Prior Publication Data

US 2024/0241237 A1 Jul. 18, 2024

Related U.S. Application Data

(63) Continuation of application No. 17/372,988, filed on Jul. 12, 2021, now Pat. No. 11,940,572, which is a continuation of application No. 17/221,694, filed on Apr. 2, 2021, now Pat. No. 11,061,123, which is a continuation of application No. 17/129,061, filed on Dec. 21, 2020, now Pat. No. 10,983,200.

(51) Int. Cl.
*G01S 7/499* (2006.01)
*G01S 17/06* (2006.01)
*G02B 6/12* (2006.01)
*G02B 6/122* (2006.01)
*G02B 6/126* (2006.01)
*G02B 27/28* (2006.01)

(52) U.S. Cl.
CPC ............. *G01S 7/499* (2013.01); *G01S 17/06* (2013.01); *G02B 6/1228* (2013.01); *G02B 6/126* (2013.01); *G02B 27/283* (2013.01); *G02B 2006/12138* (2013.01); *G02B 2006/1215* (2013.01)

(58) Field of Classification Search
None
See application file for complete search history.

(56) References Cited

U.S. PATENT DOCUMENTS

| | | | |
|---|---|---|---|
| 8,873,899 | B2 | 10/2014 | Anderson et al. |
| 9,915,781 | B1 | 3/2018 | Lin |
| 2003/0081903 | A1 | 5/2003 | Vahala et al. |
| 2014/0153862 | A1 | 6/2014 | Picard |

(Continued)

FOREIGN PATENT DOCUMENTS

EP 3015887 A1 5/2016

OTHER PUBLICATIONS

Sacher et al. "Polarization rotator-splitters and controllers in a Si3N4-on-SOI integrated photonics platform", Optics Express, vol. 22, No. 9, pp. 11167-11174. (Year: 2014).*

(Continued)

*Primary Examiner* — Eric L Bolda
(74) *Attorney, Agent, or Firm* — Womble Bond Dickinson (US) LLP

(57) ABSTRACT

A polarization splitter-rotator (PSR) is described. The PSR having a silicon nitride based waveguide including a first silicon nitride segment comprising a tapered width in a longitudinal direction and a ridge extending in a transverse direction and an adiabatic coupler coupled with the first silicon nitride segment.

20 Claims, 7 Drawing Sheets

(56) References Cited

U.S. PATENT DOCUMENTS

| | | |
|---|---|---|
| 2014/0270620 A1 | 9/2014 | Anderson et al. |
| 2015/0338577 A1 | 11/2015 | Shi et al. |
| 2017/0068048 A1 | 3/2017 | Kamei et al. |
| 2017/0075063 A1 | 3/2017 | Brouckaert et al. |
| 2017/0336565 A1 | 11/2017 | Ryckman et al. |
| 2018/0149810 A1 | 5/2018 | Park et al. |
| 2020/0301071 A1 | 9/2020 | Nagarajan |
| 2020/0341193 A1 | 10/2020 | Nagarajan |

OTHER PUBLICATIONS

International Search Report and Written Opinion on the Patentability of Application No. PCT/US2021/061837 Mailed Mar. 10, 2022, 15 pages.
Wesley D. Sacher et al: "Polarization Rotator-Spitters in Standard Active Silicon Photonics Platforms" Feb. 24, 2014, 10 pages.

* cited by examiner

POLARIZATION SPLITTER-ROTATOR HAVING SILICON BASED WAVEGUIDE WITH SILICON NITRIDE SEGMENT

RELATED APPLICATIONS

This application is a continuation of U.S. patent application Ser. No. 17/372,988, filed Jul. 12, 2021, which is a continuation of U.S. patent application Ser. No. 17/221,694, filed Apr. 2, 2021, which issued on Jul. 13, 2021 as U.S. Pat. No. 11,061,123, which is a continuation of U.S. patent application Ser. No. 17/129,061, filed Dec. 21, 2020, which issued on Apr. 20, 2021 as U.S. Pat. No. 10,983,200, the entire contents of which are hereby incorporated by reference.

TECHNICAL FIELD

The present disclosure relates generally to polarization management, and more particularly to on-chip polarization management, for example, polarization management in a light detection and ranging (LiDAR) system.

BACKGROUND

Polarization management is important in photonic systems including LiDAR systems, coherent links, data com links, etc. For example, in a LiDAR system, a transverse electric (TE)—polarized optical beam is sent through a transmitting circuit for detection and ranging. Using downstream optics, a returned optical beam scattered from a target is a transverse magnetic (TM)—polarized optical beam. Because a receiving circuit only works for a TE-polarized optical beam, a polarization state of the returned optical beam needs to be rotated from a TM—polarized optical beam to a TE—polarized optical beam. However, conventional techniques are difficult to operate under high optical power and have a limited power handling capability.

SUMMARY

The present disclosure describes various examples of polarization management waveguides or devices, e.g., polarization management waveguides in LiDAR systems. As an example, disclosed herein is an integrated silicon nitride ($Si_3N_4$) polarization splitter-rotator (PSR). In one example, a PSR includes a silicon nitride based waveguide to split and rotate an optical beam, the silicon nitride based waveguide includes a first silicon nitride segment including a first layer and a second layer, the first silicon nitride segment having tapered widths along a longitudinal direction. The second layer includes a first section and a second section. The first section extends from a first end of the first silicon nitride segment to a converging plane with increasing widths, and the second section extends from the converging plane to a second end of the first silicon nitride segment with decreasing widths.

In some embodiments, the silicon nitride based waveguide includes a second silicon nitride segment including a silicon nitride adiabatic coupler and the second silicon nitride segment is coupled with the first silicon nitride segment. In some embodiments, the silicon nitride adiabatic coupler passes a first fundamental transverse electric (TE0) mode of the optical beam through a first path and a second TE0 mode of the optical beam through a second path. In some embodiments, the first and second TE0 modes of the optical beam are transmitted to a waveguide using the first and second paths. In some embodiments, the first and second TE0 modes of the optical beam are transmitted to a circuit using the first and second paths. In some embodiments, the first silicon nitride segment is to pass a first fundamental transverse electric (TE0) mode of the optical beam and to rotate a fundamental transverse magnetic (TM0) mode of the optical beam to a first order transverse electric (TE1) mode of the optical beam.

In some embodiments, the silicon nitride adiabatic coupler includes a first arm and a second arm, and the first arm of the silicon nitride adiabatic coupler is to pass the first TE0 mode of the optical beam. In some embodiments, the second arm of the silicon nitride adiabatic coupler is to couple the TE1 mode of the optical beam and convert the TE1 mode of the optical beam to a second TE0 mode of the optical beam. In some embodiments, the first layer includes a ridge extending above the second layer, and a thickness of the first layer is larger than a thickness of the second layer. In some embodiments, a width of the first layer is less than a width of the second layer.

In some embodiments, a length of the first section is larger than a length of the second section. In some embodiments, a ratio of a width of the first layer to a width of the second layer at the converging plane is between 30% to 60%. In some embodiments, a thickness of the first layer is from 300 nanometers (nm) to 600 nm, and a thickness of the second layer is from 100 nm to 500 nm. In some embodiments, the first layer has a width from 500 nanometers (nm) to 2000 nm, and the second layer has a maximum width from 1000 nm to 3000 nm. In some embodiments, the first layer has a length from 500 micron ($\mu$m) to 5000 $\mu$m, and the second layer has a length from 500 $\mu$m to 5000 $\mu$m.

According to some embodiments, a PSR includes a silicon nitride based waveguide to split and rotate an optical beam, the silicon nitride based waveguide including a first silicon nitride segment including a first layer and a second layer, the first silicon nitride segment having tapered widths along a longitudinal direction and a second silicon nitride segment including a silicon nitride adiabatic coupler. The second silicon nitride segment is coupled with the first silicon nitride segment. The silicon nitride adiabatic coupler includes a first arm and a second arm. The first arm is extended from the first silicon nitride segment. The first arm includes a first silicon nitride taper with tapered widths along a longitudinal direction. In some embodiments, a first section of the first arm and a first section of the second arm have a constant edge-to-edge spacing. In some embodiments, the second arm includes a second silicon nitride taper with tapered widths along a longitudinal direction. In some embodiments, the second arm includes the first section and a second section having an angle from a first direction of the first section and a third section parallel to the first direction of the first section. In some embodiments, the first section of the first arm and the first section of the second arm are placed parallel to each other.

According to some embodiments, a LIDAR system includes an optical source to emit an optical beam and a PSR including a silicon nitride based waveguide to split and rotate a target return signal of the optical beam from a target. The silicon nitride based waveguide includes a first silicon nitride segment and a second silicon nitride segment. The first silicon nitride segment includes a first layer and a second layer. The second layer includes a first section and a second section. The first section extends from a first end of the first silicon nitride segment to a converging plane with increasing widths, and the second section extends from the converging plane to a second end of the first silicon nitride segment with decreasing widths. The LIDAR system includes an optical element to generate a local oscillator (LO) signal and an optical detector to mix the target return signal with the LO signal to generate a heterodyne signal to extract range and velocity information of the target.

In some embodiments, the first silicon nitride segment is to pass a first fundamental transverse electric (TE0) mode of the optical beam and to rotate a fundamental transverse magnetic (TM0) mode of the optical beam to a first order transverse electric (TE1) mode the optical beam. In some embodiments, the second silicon nitride segment includes a silicon nitride adiabatic coupler. The silicon nitride adiabatic coupler includes a first arm and a second arm. The first arm of the silicon nitride adiabatic coupler is to pass the TE0 mode of the optical beam and the second arm of the silicon nitride adiabatic coupler is to couple the TE1 mode of the optical beam and convert the TE1 mode of the optical beam to a second TE0 mode of the optical beam. In some embodiments, the first layer includes a ridge extending above the second layer and a thickness of the first layer is larger than a thickness of the second layer.

Advantageously, the PSR comprising the silicon nitride based waveguide disclosed herein is CMOS-compatible and enables operation under a high optical power. The silicon nitride based waveguide PSR has a low confinement factor, which results in a low power density and increases a power threshold at which two photon absorption occurs. Therefore, the power handling capability in the silicon nitride based waveguide PSR is improved. Thermal stability in the silicon nitride based waveguide PSR is improved as well due to a low thermal-optic coefficient of the silicon nitride layer.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The present disclosure describes examples of polarization management waveguides, for example, polarization management waveguides in coherent LiDAR systems, e.g., frequency-modulated continuous-wave (FMCW) LiDAR systems. The polarization management waveguides include integrated PSRs, for example, integrated silicon nitride PSRs. The described integrated PSRs may be implemented in any applications that require polarization management. The described LIDAR system may be implemented in any sensing market, such as, but not limited to, transportation, manufacturing, metrology, medical, virtual reality, augmented reality, and security systems. According to some embodiments, the described LiDAR system may be implemented as part of a front-end coherent LiDAR system (e.g., a FMCW LiDAR device) that assists with spatial awareness for automated driver assist systems, or self-driving vehicles.

Range and velocity profile of a target may be measured using a coherent LiDAR system, e.g., a FMCW LiDAR system, wherein backscattered light from the target may be mixed with an LO signal to generate a coherent heterodyne signal, from which range and velocity information of the target may be extracted. Maximizing a collection and mixing efficiency of a scattered target signal with the LO signal is important to increase a signal-to-noise ratio (SNR) of the system, which in turn enhances a detection sensitivity. The target may scatter an incident light into scattered light with multiple arbitrary polarization states, regardless of a polarization state of the incident light. By maximizing the collection and mixing of the scattered target signal with the LO signal in all polarization states, an improvement in the SNR of the system may be realized.

Figure 1:
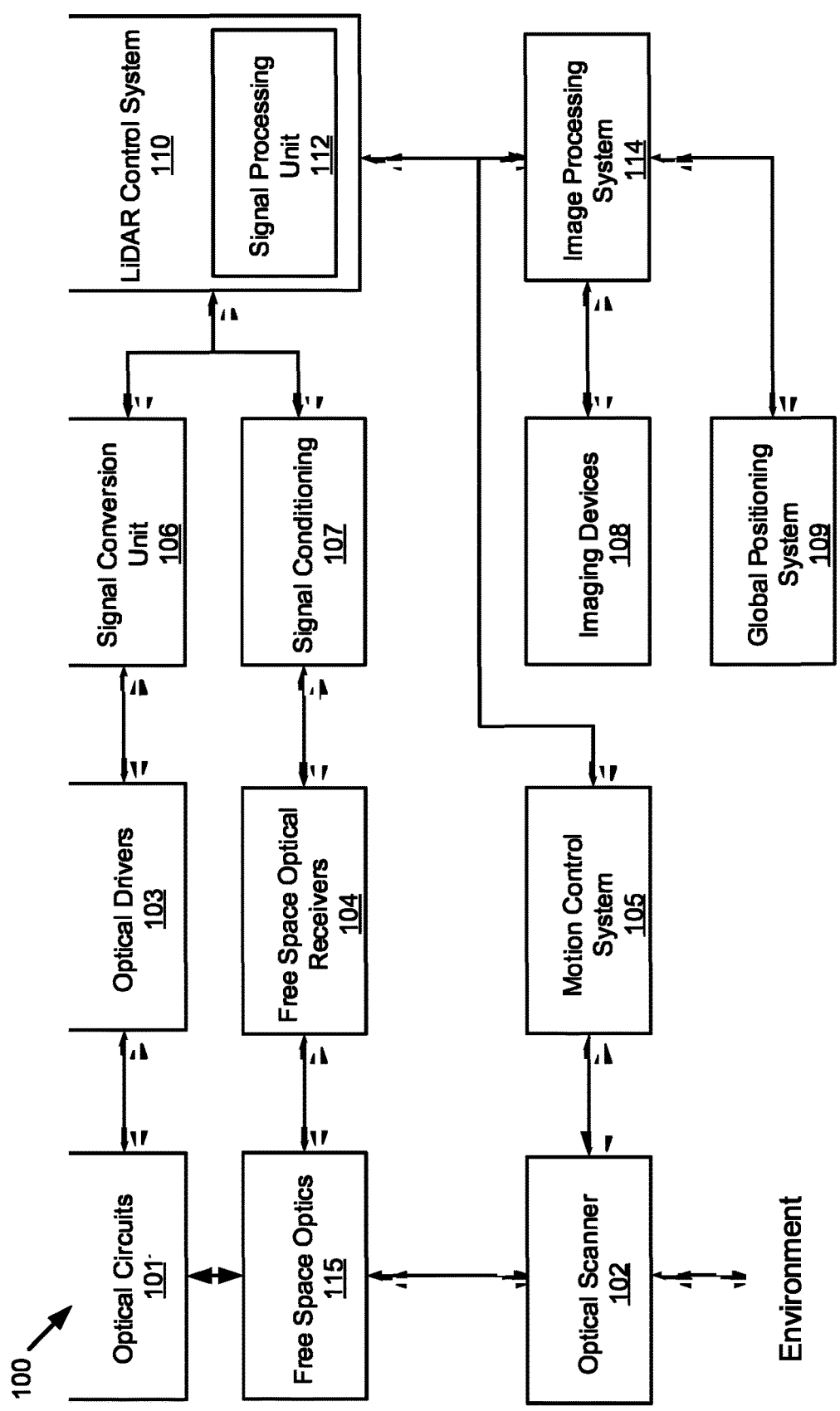
FIG. 1 is a block diagram illustrating an example LiDAR system according to embodiments of the present disclosure.

FIG. 1 illustrates a LiDAR system 100 according to example implementations of the present disclosure. The LiDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LiDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LiDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
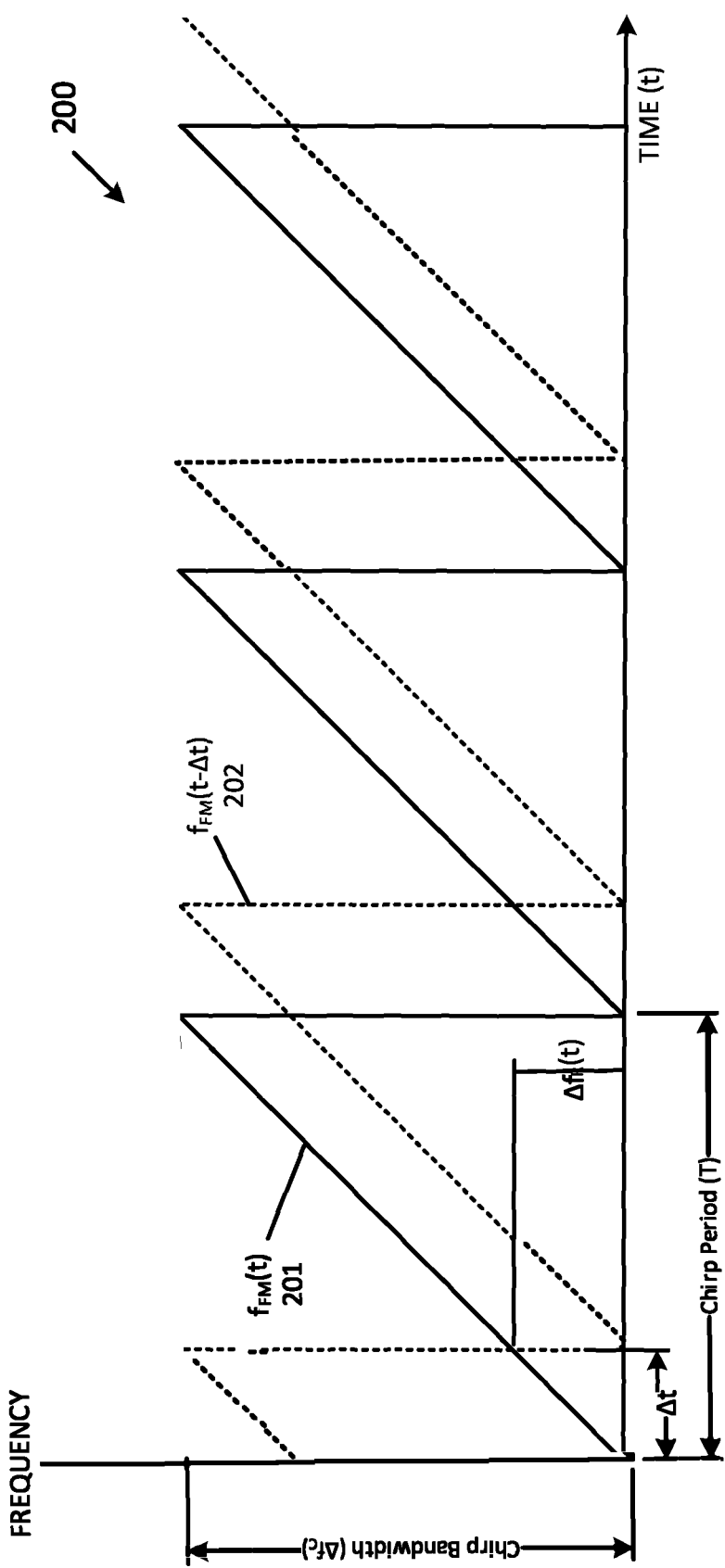
FIG. 2 is a time-frequency diagram illustrating an example of FMCW LIDAR waveforms according to embodiments of the present disclosure.

FIG. 2 is a time-frequency diagram 200 of an FMCW scanning signal 101b that can be used by a LiDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
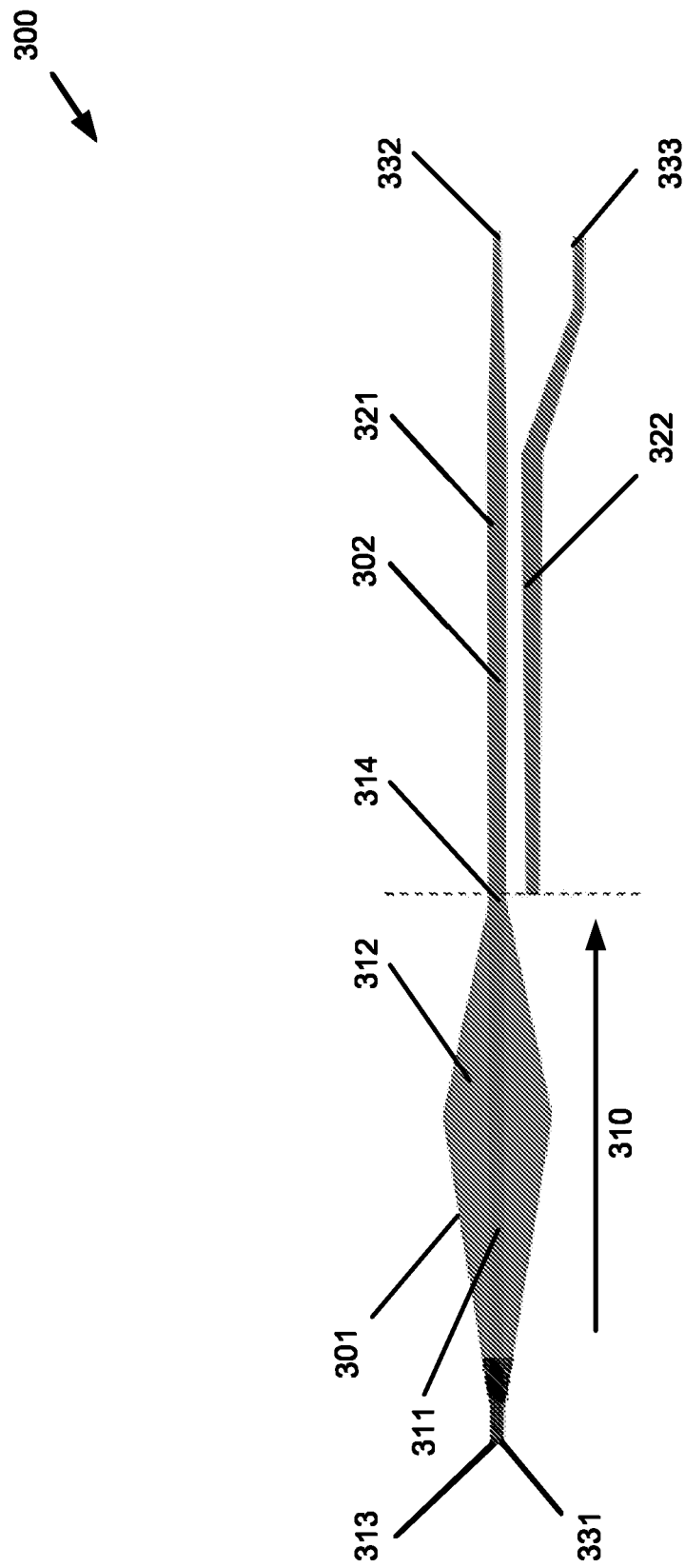
FIG. 3 is a diagram illustrating an example of an integrated silicon nitride polarization splitter-rotator (PSR) according to embodiments of the present disclosure.

FIG. 3 is a diagram illustrating an example of an integrated silicon nitride ($Si_3N_4$) polarization splitter-rotator (PSR) 300 according to embodiments of the present disclosure. The integrated silicon nitride PSR 300 is a CMOS-compatible pure silicon nitride based PSR. The integrated silicon nitride PSR 300 comprises a silicon nitride based waveguide, which includes a first silicon nitride segment 301 and a second silicon nitride segment 302. The integrated silicon nitride PSR 300 includes an input port 331, a first output port 332 and a second output port 333. The first silicon nitride segment 301 includes a first layer 311 and a second layer 312. The first silicon nitride segment 301 has tapered widths along a longitudinal direction 310. The first silicon nitride segment 301 includes a first end 313 and a second end 314. The first silicon nitride segment 301 is a tapered structure with decreasing widths towards an end, e.g., the second end 314. The first silicon nitride segment 301 is a waveguide segment or waveguide with continuous changing waveguide cross-sections. According to some embodiments, the integrated silicon nitride PSR 300 described herein can have a low insertion loss. For instance, because a photon absorption coefficient in a silicon nitride waveguide can be approximately 10 times lower than that of a silicon waveguide, the power handling capability of the integrated silicon nitride PSR 300 can be approximately 10 times better than that of the silicon waveguide. Further, the thermal-optics coefficient of a silicon nitride is approximately 10 times lower than that of the silicon waveguide, therefore, the optical performance of the integrated silicon nitride PSR 300 is much more stable than a silicon waveguide with changing temperatures.

For example, the first segment 301 may include a bilayer silicon nitride taper. A taper described herein refers to a waveguide segment or a waveguide having tapered widths along a longitudinal direction. As an example, a taper may refer to a waveguide segment or a waveguide having a tapered structure with decreasing widths towards an end. As another example, a taper may refer to a waveguide segment or waveguide with continuous changing waveguide cross-sections. A taper can be produced by gently stretching an optical fiber while it is heated. A taper may be used for mode matching, mode filtering, optical beam coupling, etc.

The second silicon nitride segment 302 has a first arm 321 and a second arm 322. For example, the second silicon nitride segment 302 includes a silicon nitride adiabatic coupler. The second silicon nitride segment 302 may include two fully etched silicon nitride tapers placed close to each other. The first arm 321 may include a first silicon nitride taper. The second arm 322 may include a second silicon nitride taper. The second silicon nitride segment 302 is coupled with the first silicon nitride segment 301, e.g., at the second end 314. As depicted in FIG. 3, the second end 314 is an output port of the first silicon nitride segment 301 and an input port of the second silicon nitride segment 302.

Figure 4:
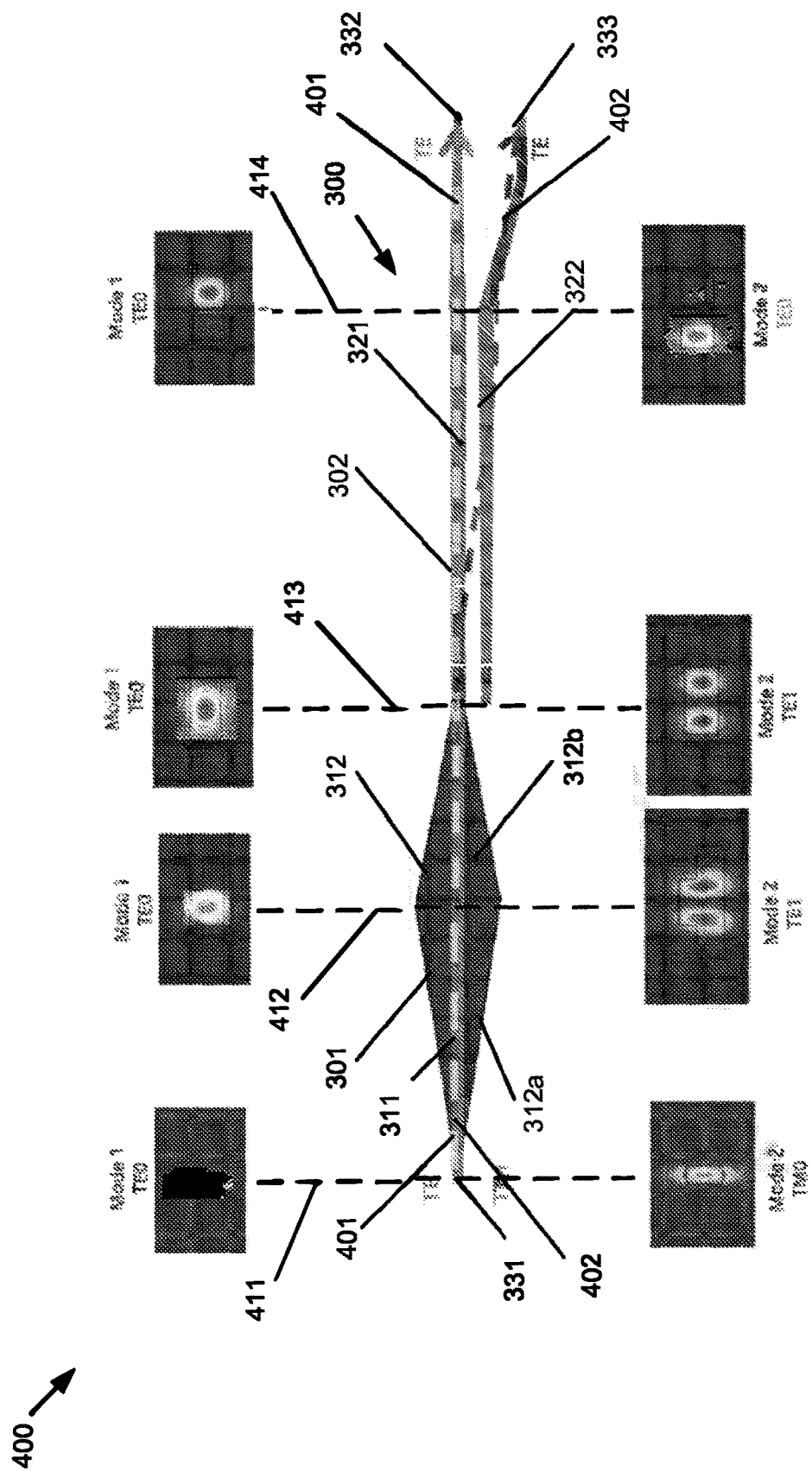
FIG. 4 is a diagram illustrating an example of modes of an optical beam along an integrated silicon nitride PSR according to embodiments of the present disclosure.

FIG. 4 is a diagram illustrating an example of modes of an optical beam along the integrated silicon nitride PSR 300 according to embodiments of the present disclosure. A TE-polarized optical beam launched into the input port 331 is routed by the PSR 300 to the first output port 332. A TM-polarized optical beam launched into the input port 331 is first rotated from a fundamental transverse magnetic (TM0) mode of the optical beam to a first order transverse electric (TE1) mode of the optical beam through the first silicon nitride segment 301, e.g., the bilayer taper. Then, the TE1 mode of the optical beam is converted to a TE0 mode of the optical beam through the second silicon nitride segment 302, e.g., the adiabatic coupler, and further directed to the second output port 333. In this way, the integrated silicon nitride PSR 300 separates the TE-polarized optical beam and TM-polarized optical beam, and directs the TE-polarized optical beam and TM-polarized optical beam to corresponding separate waveguides or circuits (not shown).

The profiles of the modes with the first and second highest effective indices (i.e., "mode 1" and "mode 2") at different planes (e.g., 411, 412, 413, 414) along the integrated silicon nitride PRS 300 are illustrated in FIG. 4. As shown in FIG. 4, strong mode hybridization is achieved in the first silicon nitride segment 301, e.g., the bilayer taper.

FIG. 4 illustrates how the modes evolve along the integrated silicon nitride PRS 300. The introduction of the bilayer (e.g., 311, 312) in the first silicon nitride segment 301 (e.g., the bilayer taper) breaks the vertical symmetry of the structure of the integrated silicon nitride PSR 300. As a result, a polarization axis of the integrated silicon nitride PSR 300 is not aligned with either polarization state of an optical beam. Thus, the optical beam passing through the first silicon nitride segment 301 (e.g., the bilayer taper) may experience polarization rotation under some particular conditions.

Referring to FIG. 4, for an optical beam launched into the input port 331, a TE-polarized component 401 of the optical beam goes efficiently to the first arm 321 (e.g., the first silicon nitride taper) of the second silicon nitride segment 302 (e.g., the silicon nitride adiabatic coupler), then goes to the first output port 332.

At a first plane 411, where the input port 311 is located, the TE-polarized component 401 of the optical beam enters the integrated silicon nitride PSR 300. At a second plane 412, which is a converging plane or a maximum width plane of the second layer 312 of the first silicon nitride segment 301 (e.g., the bilayer taper), the TE-polarized component 401 of the optical beam keeps the TE0 mode. At a third plane 413, where the second silicon nitride segment 302 is coupled with the first silicon nitride segment 301, the TE0 mode of the optical beam is unchanged. At a fourth plane 414, which is located near the output ports 332, 333, the TE0 mode of the optical beam is still unchanged.

However, for a TM-polarized component 402 of the optical beam, mode mixing occurs within the first silicon nitride segment 301 (e.g., the bilayer taper). The TM0 mode of the optical beam is gradually converted to the TE1 mode of the optical beam by the first silicon nitride segment 301 based on one or more rotations that occur at the bilayer taper. The TE1 mode of the optical beam is then coupled to the second arm 322 (e.g., the second silicon nitride taper) of the silicon nitride second segment 302 (e.g., the silicon nitride adiabatic coupler), while being converted to a TE0 mode of the optical beam through the second silicon nitride segment 302 (e.g., the silicon nitride adiabatic coupler), which is a coupled two-tapers segment.

At the first plane 411, the TM-polarized component 402 of the optical beam enters the integrated silicon nitride PSR 300. At the second plane 412, which is the converging plane or the maximum width plane of the second layer 312 of the first silicon nitride segment 301 (e.g., the bilayer taper), the TM0 mode of the optical beam is converted to the TE1 mode of the optical beam. The mode conversion occurs when the mode index of TM0 is equal to that of the TE1, where strong mode hybridization takes place. At the third plane 413, the TM0 mode of the optical beam is converted to the TE1 mode of the optical beam. At a fourth plane, the TE1 mode of the optical beam is coupled to the second arm 322 (e.g., the second silicon nitride taper) of the second segment 302 (e.g., the silicon nitride adiabatic coupler) and converted to a TE0 mode of the optical beam.

Figure 5B:
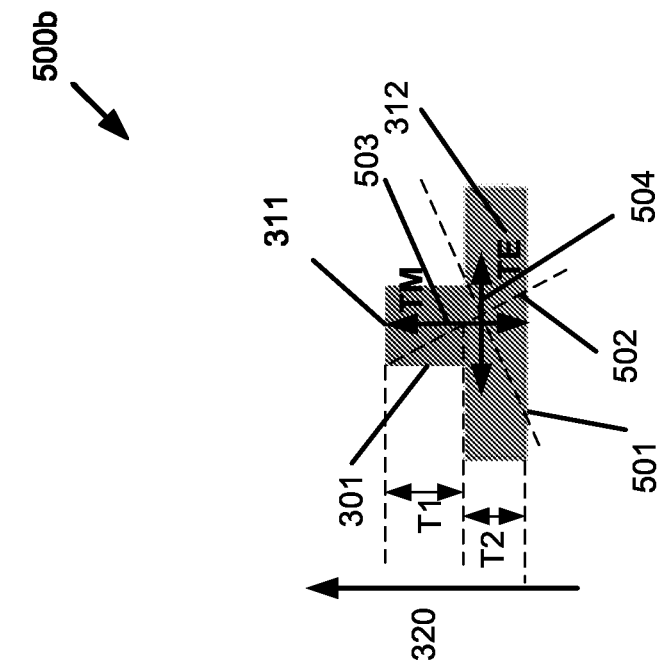
FIG. 5A and FIG. 5B are diagrams illustrating a top view and a side view of an example of a first segment of an integrated silicon nitride PSR respectively, according to embodiments of the present disclosure.
Figure 5A:
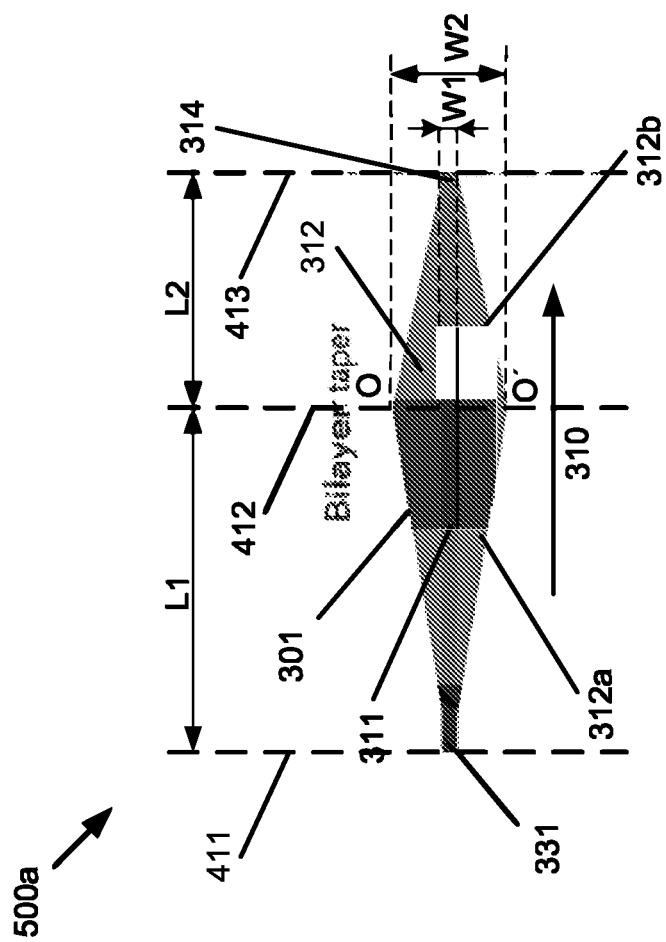

The integrated silicon nitride PSR 300 includes a silicon nitride based waveguide to split and rotate an optical beam. For example, the core of the integrated silicon nitride PSR 300 is formed of pure silicon nitride ($Si_3N_4$). Referring to FIG. 5A and FIG. 5B, the first silicon nitride segment 301 (e.g., the bilayer taper) includes a first layer 311 and a second layer 312. Both the first layer 311 and the second layer 312 are formed of pure silicon nitride ($Si_3N_4$). The first layer 311 includes a ridge extending above the second layer 312, as illustrated in FIG. 5B. In one embodiment, a thickness of the first layer 311 is larger than a thickness of the second layer 312. The thickness of the first layer 311 may be from 200 nanometers (nm) to 600 nm. In one embodiment, the thickness of the first layer 311 may be from 300 nanometers (nm) to 600 nm. For example, the thickness of the first layer 311 may be 400 nm. In one embodiment, the thickness of the second layer 312 is from 100 nm to 500 nm. For example, the thickness of the second layer 312 may be 250 nm.

In one embodiment, the second layer 312 includes a first section 312a and a second section 312b, where the first section 312a extending from the first end 331 of the first silicon nitride segment 301 to the converging plane 412 with increasing widths, and where the second section 312b extending from the converging plane 412 to the second end 314 of the first silicon nitride segment 301 with decreasing widths. As illustrated in FIG. 5A, the converging plane 412, illustrated as O-O', is a plane where the first section 312a and the second section 312b converge. For example, the converging plane O-O' 412 corresponds to a cross section with a maximum width in the first silicon nitride segment 301 (e.g., the bilayer taper). Thus, the converging plane O-O' 412 is the maximum width plane of the first silicon nitride segment 301 (e.g., the bilayer taper).

In one embodiment, a length of the first section L1 312a is longer than a length of the second section L2 312b. Because the mode conversion (TM0 to TE1) frequently occurs in the first section 312a of the first silicon nitride segment 301 (e.g., the bilayer taper), the first section L1 312a is generally longer than the second section of 312b in order ensure a mode conversion efficiency that is close to unit and minimal TM0 residual. According to some embodiments, the length of the first section 312a may be from 400 micron (μm) to 5000 μm. For example, the length of the first section 312a may be 1300 μm. The length of the second section 312b may be from 50 μm to 500 μm. For example, the length of the second section 312b may be 200 μm. In one embodiment, the first silicon nitride segment 301 (e.g., the bilayer taper) may have a length from 450 μm to 5500 μm. For example, the first silicon nitride segment 301 (e.g., the bilayer taper) may have a length of 1500 μm.

The first silicon nitride segment 301 (e.g., the bilayer taper) is asymmetrical in a vertical direction 320. As illustrated in FIG. 5B, the primary axis (e.g., 501, 502) of the first silicon nitride segment 301 is tilted due to the bilayer structure, which is not aligned with either the horizontal axis or vertical axis. As a result, for the TE (e.g., 504) or TM mode (e.g., 503) of the optical beam that is launched in the bilayer taper due to the fact that its polarization axis is not aligned or normal to the primary axis of the first silicon nitride segment 301, the polarization rotation of the optical beam generally occurs during light propagations in the first silicon nitride segment 301.

In one embodiment, widths of the first layer 311 are less than widths of the second layer 312. In one embodiment, the first layer 311 has a width W1 from 1000 nm to 3000 nm at the converging plane 412, and the second layer has a maximum width W2 from 1300 nm to 6500 nm at the converging plane 412. For example, the first layer 311 has the width W1 of 1800 nm at the converging plane 412, and the second layer has the maximum width W2 of 4300 nm at the converging plane 412. In one embodiment, a ratio of the width of the first layer 311 at the converging plane 412 to the width of the second layer 312 at the converging plane 412 is between 40% to 60%.

According to some embodiments, the integrated silicon nitride PSR 300 described herein operates in accordance with mode evolution. In the first section 312a of the first silicon nitride segment 301 (e.g., the bilayer taper), the first layer 311 (e.g., the ridge) and the second layer 312 (e.g., partially-etched slab) continue widening, during which the difference between the effective index of TM0 and TE1 decreases and thus mode conversion occurs. In the second section 312b of the first silicon nitride segment 301 (e.g., the bilayer taper), the first layer 311 (e.g., the ridge) continues to widen and the second layer 312 (e.g., partially-etched slab) narrows. The second section 312b of the first silicon nitride segment 301 (e.g., the bilayer taper) is used to provide a fully-etched wide waveguide as the input to the second silicon nitride segment 302 (e.g., the adiabatic coupler).

Figure 6:
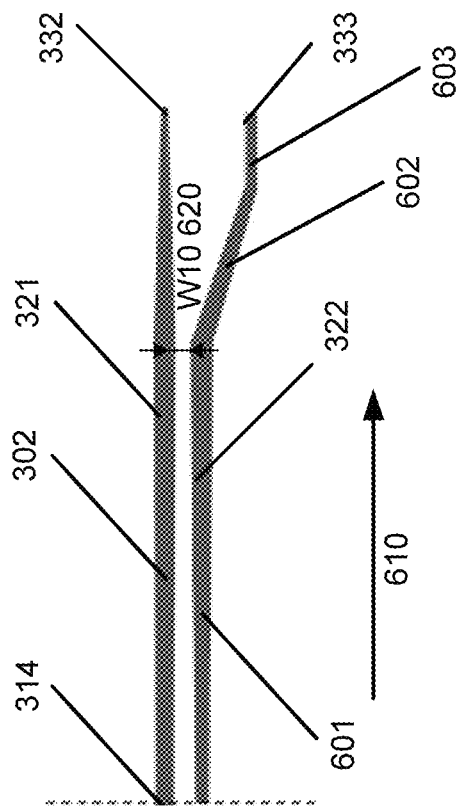
FIG. 6 is a diagram illustrating an example of a second segment of an integrated silicon nitride PSR according to embodiments of the present disclosure.

FIG. 6 is a diagram illustrating an example of the second silicon nitride segment 302 (e.g., the silicon nitride adiabatic coupler) of the integrated silicon nitride PSR 300 according to embodiments of the present disclosure. The second silicon nitride segment 302 (e.g., the silicon nitride adiabatic coupler) may be formed of pure silicon nitride. The second silicon nitride segment 302 (e.g., the silicon nitride adiabatic coupler) may include a first arm 321 (top arm) and a second arm 322 (bottom arm).

In one embodiment, the first arm 321 may be extended from the first silicon nitride segment 301. The first arm 321 may be coupled with the first silicon nitride segment 301. For example, the first arm 321 may be continued from the second end 314 of the first silicon nitride segment 301. The first arm 321 includes a first silicon nitride taper with tapered widths along a longitudinal direction. The first arm 321 includes the first output port 332 of the PSR 300.

In one embodiment, the second arm 322 includes a second silicon nitride taper with tapered widths along a longitudinal direction. In one embodiment, the second arm 322 has a first section 601, a second section 602 and a third section 603 that is parallel to the first direction of the first section 601. The second section 602 may have an angle from a first direction 610 of the first section 601. The third section 603 may be parallel to the first direction 610 of the first section 601. The second arm 322 includes the second output port 333 of the PSR 300.

In one embodiment, a portion of the first arm 321 and the section 601 of the second arm 322 have a constant edge-to-edge spacing W10, as illustrated in FIG. 6. In one embodiment, the constant edge-to-edge spacing W10 620 is from 100 nm to 400 nm. For example, the constant edge-to-edge spacing W10 620 is 200 nm.

The second silicon nitride segment 302 (e.g., the silicon nitride adiabatic coupler) follows the first silicon nitride segment 301 (e.g., the bi-level taper). The second silicon nitride segment 302 includes two fully-etched silicon nitride waveguides (e.g., the first arm 321 and the second arm 322), with symmetric SiO2 cladding, which prevents crosstalk between the TE1 and TM0 modes. The evolution of TE1 to TE0 in the second silicon nitride segment 302 (e.g., the silicon nitride adiabatic coupler) is as follows. At the start of the second silicon nitride segment 302, the second arm 322 (which is a narrow waveguide) beginning with a blunt tip is placed next to the first arm 321 (which is a broad waveguide). The gap between the first arm 321 and the second arm 322 (e.g., two waveguides) are kept constant, for example, at 200 nm. The TE0 mode and TE1 mode of the optical beam from the first silicon nitride segment 301 (e.g., the bi-level taper) are well confined in the first arm 321 (broad waveguide) and have negligible overlap with the second arm 322 (narrow waveguide). Then the first arm 321 (broad waveguide) is narrowed while the second arm 322 (narrow waveguide) is widened. At some point when a phase matching condition is matched for the TE1 mode of the optical beam, the TE1 mode of the optical beam may be transferred to the second arm 322 (narrow waveguide), and the TE0 mode of the optical beam may remain confined in the first arm 321 (broad waveguide). According to some embodiments, the coupling between the second arm 322 of the second silicon nitride segment 302 and the first arm 321 of the second silicon nitride segment 302 may be evanescent in nature rather than physical. The evanescent-wave coupling is used to achieve efficient light coupling between two closely spaced asymmetric waveguides fabricated side by side. Finally, the second arm 322 (narrow waveguide) may be bent away from the first arm 321 (broad waveguide) using an arc with sufficient large bend radius (as illustrated in FIG. 6) to decouple the first arm 321 and the second arm 322 (e.g., two waveguides).

Figure 7:
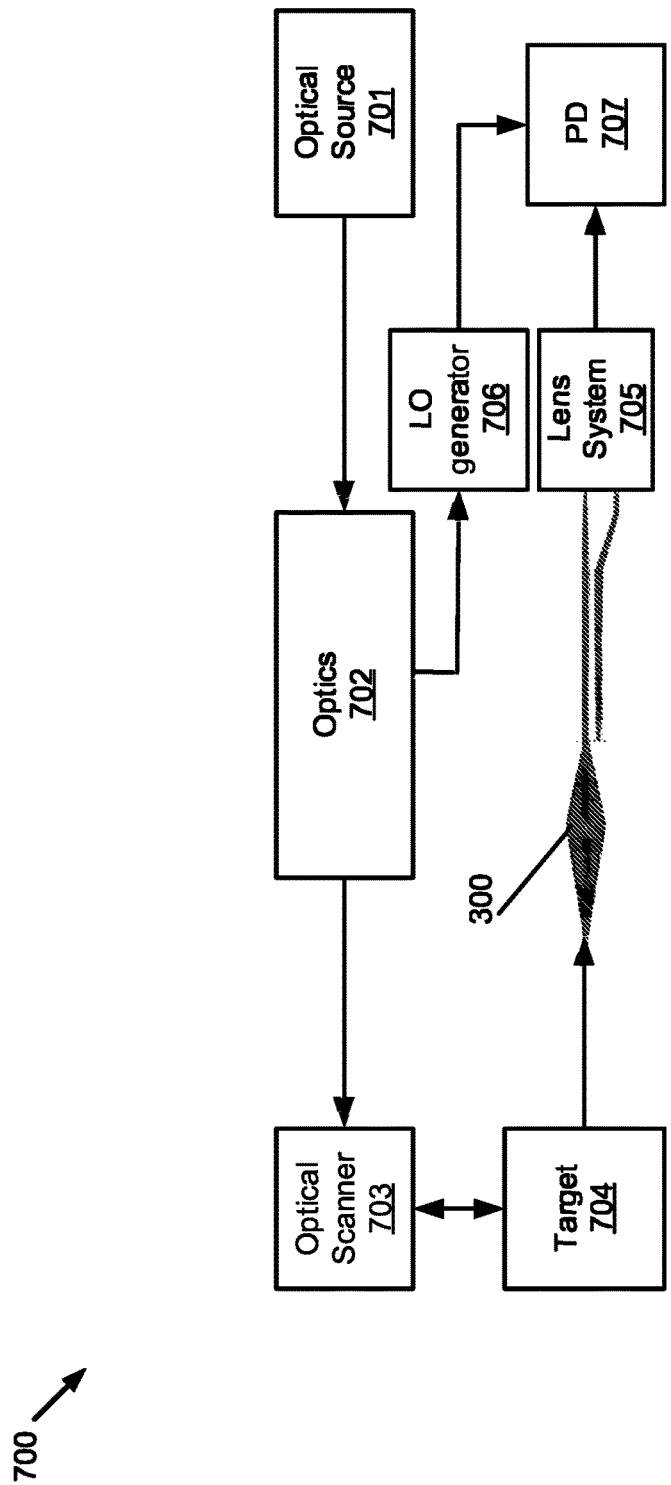
FIG. 7 is a block diagram illustrating an example of an integrated silicon nitride PSR in a LiDAR system according to embodiments of the present disclosure.

FIG. 7 is a block diagram illustrating an example of the integrated silicon nitride PSR 300 in a LiDAR system 700 according to embodiments of the present disclosure. Referring to FIG. 7, the LiDAR system 700 may comprise an optical source 701 to emit an optical beam. The optical source 701 may be placed in the optical circuit 101 as described in FIG. 1. The LiDAR system 700 may comprise optics 702, e.g., free space optics 115 as described in FIG. 1, to direct the optical beam to an optical scanner 703. For example, the optical scanner 703 may be the optical scanner 102 as described in FIG. 1. The optical scanner 703 may illuminate and scan a target 704 in a target environment. The target 704 in the target environment may scatter the optical beam into a return optical beam or a target return signal. The optical scanner 703 also collects the return optical beam or the target return signal. The return optical beam or the target return signal may be directed to the PSR 300.

The LiDAR system 700 may comprise the PSR 300, which comprises a silicon nitride based waveguide. The PSR 300 is to split and rotate the target return signal of the optical beam from the target 704. As discussed above, the PSR 300 comprises the silicon nitride based waveguide including the first silicon nitride segment (e.g., 301) and the second silicon nitride segment (e.g., 302). The first silicon nitride segment (e.g., 301) includes a first layer (e.g., 311) and a second layer (e.g., 312), and the first silicon nitride segment (e.g., 301) having tapered widths along a longitudinal direction. The second silicon nitride segment (e.g., 302) includes a silicon nitride adiabatic coupler, which includes a first arm (e.g., 321) and a second arm (e.g., 322). The first silicon nitride segment (e.g., 301) is to pass a fundamental transverse electric (TE0) mode of the optical beam and to rotate a fundamental transverse magnetic (TM0) mode of the optical beam to a first order transverse electric (TE1) mode of the optical beam. The first arm (e.g., 321) of the silicon nitride adiabatic coupler (e.g., 302) is to pass the TE0 mode of the optical beam, and the second arm (e.g., 322) of the silicon nitride adiabatic coupler (e.g., 302) is to couple the TE1 mode of the optical beam and convert the TE1 mode of the optical beam to a TE0 mode of the optical beam.

The LiDAR system 700 may further comprise an optical element, e.g., LO generator 706, to generate a local oscillator (LO) signal from the optical beam. The LiDAR system 700 may further comprise a photodetector (PD) 707. The PD 707 is to mix the target return signal with the LO signal to generate a heterodyne signal to extract range and velocity information of the target 704. For example, a lens system 705 may be placed in front of the PD 707 to collimate the target return signal.

The PSRs described herein can be CMOS-compatible and also enable operations during high optical power scenarios. In one example, the two-photon absorption coefficient of silicon nitride is low, e.g., an order of magnitude lower than that of silicon. As another example, due to a smaller index contrast in silicon nitride waveguide, a mode size in silicon nitride waveguide is much larger than that of a silicon waveguide. Thus, the silicon nitride waveguide has a lower confinement factor, which results in a reduced power density and further increases a power threshold at which two photon absorption occurs in silicon nitride waveguides. Therefore, the power handling capability in silicon nitride waveguide based PSR is improved by at least an order of magnitude compared to conventional silicon based waveguides. Thermal stability in silicon nitride PSR is improved as well due to a low thermal-optic coefficient of the silicon nitride layer. Accordingly, the performance of the LiDAR system is improved by using the integrated silicon nitride PSR.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A polarization splitter-rotator (PSR), comprising:
a silicon nitride based waveguide comprising:
a first silicon nitride segment comprising a tapered width in a longitudinal direction and a ridge extending in a transverse direction; and
an adiabatic coupler coupled with the first silicon nitride segment.

2. The PSR of claim 1, wherein the first silicon nitride segment comprises a first layer and a second layer.

3. The PSR of claim 2, wherein the first layer comprises a first section and a second section, wherein the first section extends from a first end of the first silicon nitride segment to a converging plane with increasing width.

4. The PSR of claim 2, wherein the adiabatic coupler passes a first fundamental transverse electric (TE0) mode of an optical beam through a first path and a second TE0 mode of the optical beam through a second path.

5. The PSR of claim 2, wherein the second layer comprises the ridge, wherein the ridge extends above the first layer.

6. The PSR of claim 2, wherein a width of the first layer is less than a width of the second layer.

7. The PSR of claim 3, wherein a length of the first section is larger than a length of the second section.

8. The PSR of claim 2, wherein a thickness of the first layer is from 300 nanometers (nm) to 600 nm, and wherein a thickness of the second layer is from 100 nm to 500 nm.

9. The PSR of claim 2, wherein the first layer has a width from 500 nanometers (nm) to 2000 nm, and wherein the second layer has a maximum width from 1000 nm to 3000 nm.

10. The PSR of claim 2, wherein the first layer has a length from 500 micron (μm) to 5000 μm, and wherein the second layer has a length from 500 μm to 5000 μm.

11. A light detection and ranging (LiDAR) system, comprising:
a polarization splitter-rotator (PSR) comprising a silicon nitride based waveguide to split and rotate a target return signal of an optical beam from a target, the silicon nitride based waveguide comprising a first silicon nitride segment, the first silicon nitride segment comprising a tapered width in a longitudinal direction and a ridge extending in a transverse direction; and
an adiabatic coupler coupled with the first silicon nitride segment.

12. The LiDAR system of claim 11, further comprising:
an optical element to generate a local oscillator (LO) signal from the optical beam; and
an optical detector to mix the target return signal with the LO signal to generate a heterodyne signal to extract range and velocity information of the target.

13. The LiDAR system of claim 11, wherein the first silicon nitride segment comprises a first layer and a second layer.

14. The LiDAR system of claim 13, wherein the first layer comprises a first section and a second section, wherein the first section extends from a first end of the first silicon nitride segment to a converging plane with increasing width.

15. The LiDAR system of claim 13, wherein the adiabatic coupler passes a first fundamental transverse electric (TE0) mode of the optical beam through a first path and a second TE0 mode of the optical beam through a second path.

16. The LiDAR system of claim 13, wherein the second layer comprises the ridge, wherein the ridge extends above the first layer.

17. The LiDAR system of claim 13, wherein a width of the first layer is less than a width of the second layer.

18. The LiDAR system of claim 14, wherein a length of the first section is larger than a length of the second section.

19. The LiDAR system of claim 13, wherein a thickness of the first layer is from 300 nanometers (nm) to 600 nm, and wherein a thickness of the second layer is from 100 nm to 500 nm.

20. The LiDAR system of claim 13, wherein the first layer has a width from 500 nanometers (nm) to 2000 nm, and wherein the second layer has a maximum width from 1000 nm to 3000 nm.

* * * * *